United States Patent
Lee et al.

(10) Patent No.: US 7,953,822 B2
(45) Date of Patent: May 31, 2011

(54) METHOD OF AND APPARATUS FOR DOWNLOADING DATA

(75) Inventors: Eun-mi Lee, Seoul (KR); Hye-young Jun, Suwon-si (KR); Kwang-min Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 174 days.

(21) Appl. No.: 12/194,805

(22) Filed: Aug. 20, 2008

(65) Prior Publication Data

US 2009/0172130 A1      Jul. 2, 2009

(30) Foreign Application Priority Data

Jan. 2, 2008   (KR) .................. 10-2008-0000161

(51) Int. Cl.
*G06F 15/173* (2006.01)
(52) U.S. Cl. ...... 709/219; 709/224; 709/229; 455/414.3
(58) Field of Classification Search .................. 709/219, 709/230, 224, 229; 455/418, 414.3
See application file for complete search history.

(56) References Cited

U.S. PATENT DOCUMENTS

| | | | | |
|---|---|---|---|---|
| 6,230,319 B1 * | 5/2001 | Britt et al. | ...... | 717/173 |
| 6,973,474 B2 * | 12/2005 | Hatayama | ...... | 709/201 |
| 7,562,290 B2 * | 7/2009 | Xavier et al. | ...... | 715/229 |
| 7,634,260 B2 * | 12/2009 | Chun | ...... | 455/418 |
| 2007/0043867 A1 * | 2/2007 | Shigeta | ...... | 709/226 |

FOREIGN PATENT DOCUMENTS

| | | |
|---|---|---|
| JP | 2005-57482 | 3/2005 |
| KR | 2003-55331 | 7/2003 |
| WO | WO 02/09046 | 1/2002 |

OTHER PUBLICATIONS

Search Report issued in PCT International Application No. PCT/KR2008/004198 on Dec. 15, 2008.

* cited by examiner

*Primary Examiner* — Jungwon Chang
(74) *Attorney, Agent, or Firm* — NSIP Law

(57) ABSTRACT

A method of and apparatus for downloading data. The method includes: connecting the downloading apparatus to a server via a communication network and downloading data from the server; generating download information on the data downloading; when connection to the server is interrupted and the data downloading is discontinued, reconnecting the downloading apparatus to the same server using the download information; and downloading data from the server.

19 Claims, 5 Drawing Sheets

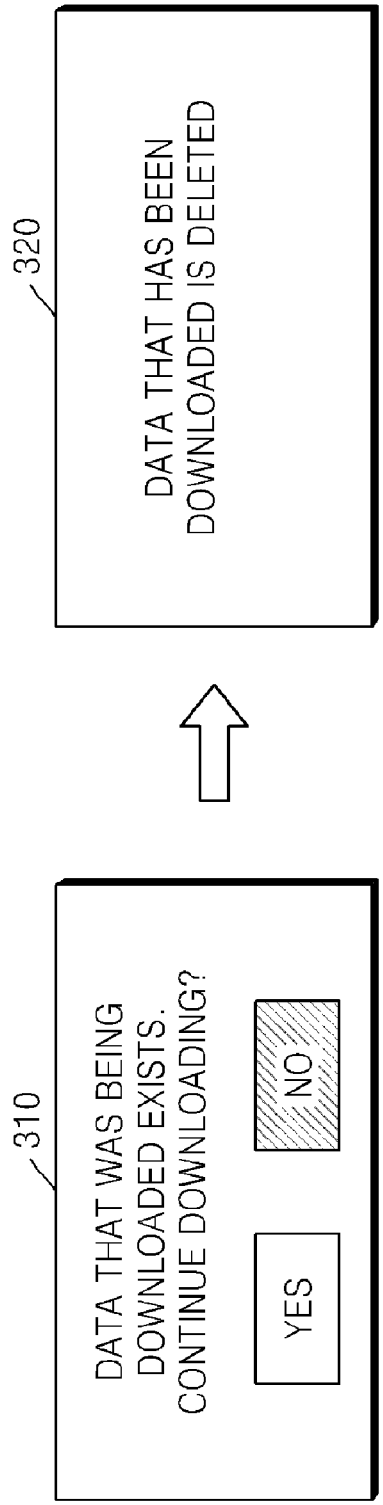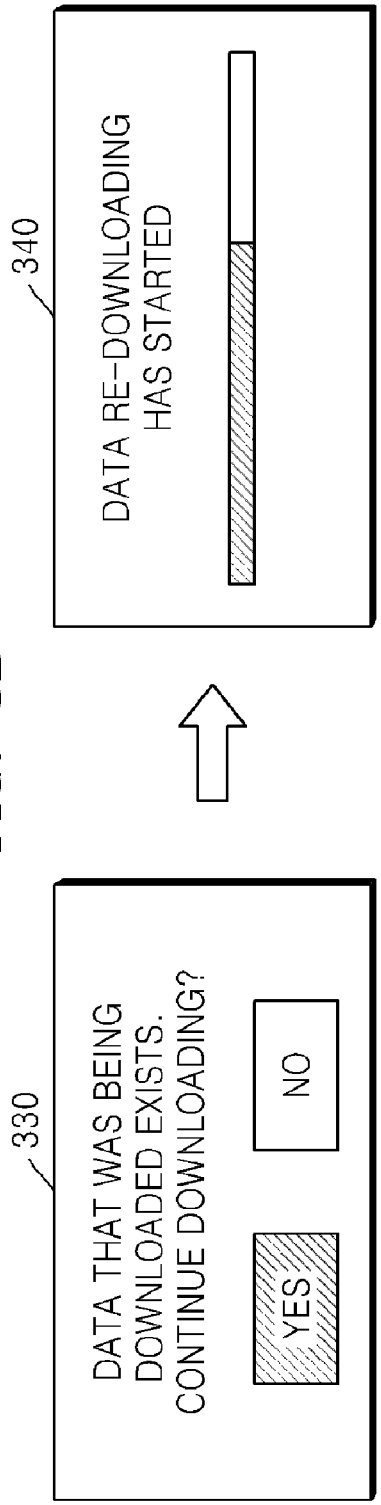

METHOD OF AND APPARATUS FOR DOWNLOADING DATA

CROSS-REFERENCE TO RELATED APPLICATION

This application claims the benefit of Korean Patent Application No. 2008-161, filed in the Korean Intellectual Property Office on Jan. 2, 2008, the disclosure of which is incorporated herein by reference.

BACKGROUND OF THE INVENTION

1. Field of the Invention

Aspects of the present invention relate to a method of and apparatus for downloading data, and more particularly, to a method of downloading data including, when a connection of a downloading apparatus to a server is disconnected while downloading data from the server, reconnecting the downloading apparatus to the server and downloading the data that was being downloaded, and an apparatus for performing the method.

2. Related Art

Many types of media signal reproducing apparatuses, such as digital TVs, computers, mobile phones, digital cameras, personal digital assistants (PDAs), MP3 players, portable media players (PMPs), and the like, have been introduced with the development of digital technologies. A media signal reproducing apparatus can receive signals from another digital apparatus via a communication network, receive broadcasting information through a broadcasting receiving unit included in the apparatus, and reproduce the received information. A recording medium storing various types of information, such as an optical disk (including a DVD, a blue-ray disc (BD), and the like), can be used in conjunction with the media signal reproducing apparatus. In some cases, the media signal reproducing apparatus may include a local storage unit in addition to a recording medium insertion unit. The local storage unit can be connected to a server or a database, via a network, and download data (such as AV data or application programs) from the server or the database, via the network. Accordingly, the media signal reproducing apparatus can reproduce data received in the recording medium inserted into the insertion unit, or reproduce the data recorded from the server or database and stored in the local storage unit. The digital reproducing apparatus can create new data by mixing the data recorded in the recording medium and the data stored in the local storage unit and can reproduce the new data.

When the media signal reproducing apparatus is connected to an external server via a communication network and is downloading data from the server, data downloading may be interrupted due to disconnection from the server, which may be caused when the media signal reproducing apparatus is turned off, for example due to a power outage. Thus, when power is restored and the media signal reproducing apparatus is turned on and is ready to download data again, because the connection to the server has been disconnected, the media signal reproducing apparatus must locate the server and reconnect to the server, via the network. Thus, a user can download desired data again only when the user reconnects the media signal reproducing apparatus to the same server and requests to download the data again. However, the media signal reproducing apparatus cannot download only remaining data from the point where data downloading was stopped, and must download data from the beginning, which increases the time for data downloading. Further, the already downloaded data remains in a memory of a media signal reproducing apparatus as fragments of data, which affects the new data downloading, thereby reducing the data storing and reproducing speed.

SUMMARY OF THE INVENTION

Aspects of the present invention provide a method of and apparatus for downloading data, the data downloading apparatus downloading data from a server, via a network, and generating at the same time information on data downloading and storing the generated information in a non-volatile memory so that data downloading can be promptly resumed using the generated information stored in the non-volatile memory when the data downloading apparatus is disconnected from and reconnected to the server in case of various problems.

Aspects of the present invention also provide a method of and apparatus for downloading data, wherein when the data downloading apparatus is disconnected from to a server during data downloading due to various problems, the downloading apparatus can be promptly reconnected to the server and data downloading can be resumed from the point where data downloading was interrupted.

According to an aspect of the present invention, a method of downloading data using a downloading apparatus is provided. The method comprises connecting the downloading apparatus to a server via a communication network and downloading data from the server; generating download information about the downloading; reconnecting the downloading apparatus to the same server using the download information when the connection to the server is interrupted and the data downloading is discontinued; and downloading the data from the reconnected server.

According to another aspect of the present invention, the downloading of the data from the reconnected server may comprise downloading data subsequent to the previously downloaded data. The method may further comprise discarding the download information when the data downloading is completed. The interruption of the connection to the server may occur when the downloading apparatus is turned off, and the reconnecting to the server using the download information may be performed when the downloading apparatus is turned on. The downloading of the subsequent data may comprise determining the subsequent data based on the total capacity of data to be downloaded and the capacity of the previously downloaded data. The reconnecting to the server may comprise receiving a request from a user to retransmit data for which downloading has been discontinued; and reconnecting to the server in response to the request for retransmission. The method may further comprise storing the generated download information in a non-volatile memory in the downloading apparatus. The non-volatile memory may comprise a read only memory (ROM), a random access memory (RAM), and a flash memory. The download information may comprise downloading progressing display identifier indicating whether data is being downloaded, server identifying information identifying the server transmitting the data, and location identifying information indicating a location in the downloading apparatus in which the downloaded data is stored. The server identifying information may be a uniform resource locator (URL) of the server. The downloading of the data may comprise storing the data in a predetermined folder in a local storage included in the downloading apparatus, wherein the location identifying information is used to identify the folder. The downloading of the data may comprise storing the data in a predetermined folder in a disk that is inserted into the downloading apparatus, wherein the location identifying information is used to identify the disk and the folder in the disk. The reconnecting to the server using the download information may comprise determining that data whose downloading is not completed exists using the downloading progressing display identifier; and reconnecting to the server using the URL of the server, wherein the downloading of the data from the reconnected server comprises identifying the folder in which the previously downloaded data is stored in the local storage of the downloading apparatus using the location identifying information and storing data downloaded from the reconnected server in the folder.

According to another aspect of the present invention, a downloading apparatus is provided. The downloading apparatus comprises a communication unit to connect to a server via a communication network and to download data from the server; a data storing unit to store the data downloaded from the server; and a control unit to generate download information on data downloading, to control the downloading apparatus to download the data from the server, and when the downloading apparatus is disconnected from the server and the data downloading is discontinued, to reconnect the downloading apparatus to the server based on the download information so that the downloading apparatus starts downloading data subsequent to the previously downloaded data from the reconnected server.

According to another aspect of the present invention, a computer readable medium is provided that stores a program to execute a method of downloading data via a downloading apparatus. The method comprises connecting the downloading apparatus to a server via a communication network and downloading data from the server; generating download information about the downloading; when the connection to the server is interrupted and the data downloading is discontinued, reconnecting the data downloading apparatus to the same server using the download information; and downloading remaining data from the reconnected server.

According to another aspect of the present invention, there is provided a method of downloading data using a downloading apparatus, the method comprising: connecting the downloading apparatus to a server via a communication network and downloading data from the server; generating download information on the data downloading; requesting the user whether to continue the data downloading after the connection to the server is interrupted and the data downloading is discontinued; and when the user does not want to continue the data downloading, deleting the previously downloaded data.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 3A-3B illustrate an on screen display (OSD) screen provided by an output unit of the data downloading apparatus according to an example embodiment of the present invention;

DETAILED DESCRIPTION OF THE EMBODIMENTS

Figure 1:
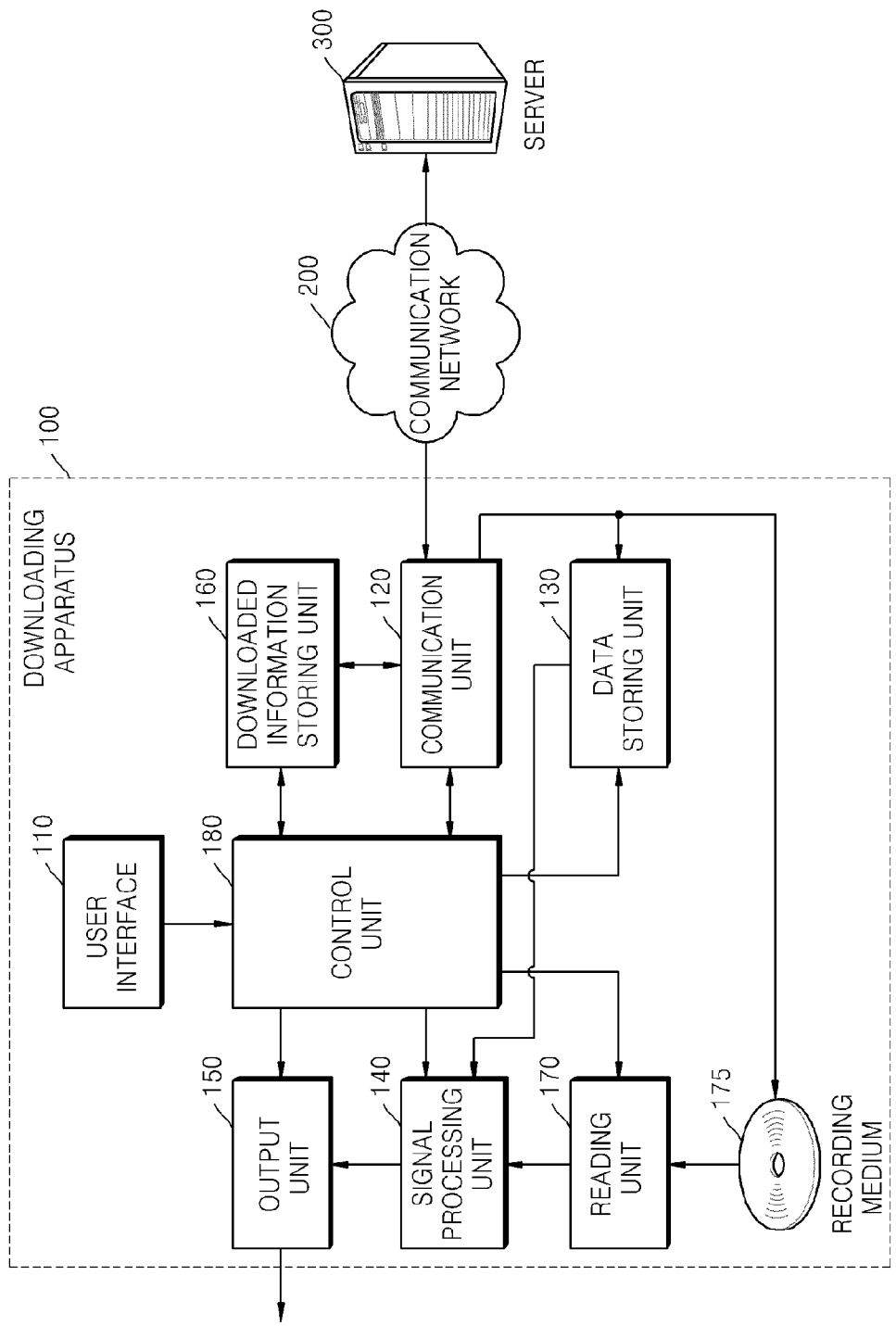
FIG. 1 is a block diagram of a data downloading apparatus according to an example embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 shows a downloading apparatus 100 according to an example embodiment of the present invention. The downloading apparatus 100 is connected to a server 300, via a network 200 and downloads data from the server 300, via the network 200. The communication network 200 may be a wired or wireless communication network, including a private network (such as a local area network (LAN)) or a public network (such as the Internet).

The downloading apparatus 100 includes a user interface 110, a communication unit 120, a data storing unit 130, a download information storing unit 160, and a control unit 180. The data downloading apparatus 100 may further include a signal processing unit 140 to process data, an output unit 150 to output the processed data, and a reading unit 170 to read data from an inserted recording medium. According to other aspects of the present invention, the downloading apparatus 100 may include additional and/or different units. Similarly, the functionality of two or more of the above units may be integrated into a single component.

The user interface 110 is used by a user to send a command to the control unit 180. Examples of the user interface 110 include physical transducers such as a keyboard, a mouse, a touchscreen, or a microphone, which can receive instructions, characters, numbers, or sound information from the user and send the information to the control unit 180.

The communication unit 120 is connected to the server 300 or a database (not shown) via the wired or wireless communication network 200. When the communication unit 120 is a wireless device, the communication unit 120 may include a wireless signal transmitting/receiving unit (not shown), a baseband processing unit (not shown), and a link control unit (not shown). The baseband processing unit and the link control unit are connected to the control unit 180 by a host control interface (HCI) to transmit and receive HCI packets, thereby transmitting/receiving control commands and transmission/reception data. Examples of wireless communication methods that can be used in this regard include wireless LAN (WLAN), bluetooth, zigbee, WiBro, and the like.

The data storing unit 130 downloads and stores the data received by the communication unit 120 from the server 300 or the database, via the network 200. The data storing unit 130 includes a local storage unit (not shown). The data storing unit 130 stores the data received from the server 300 in a predetermined folder that is included in the storing unit 130. According to circumstances, the downloaded data may be stored in a predetermined folder in a recording medium 175 that is inserted into the downloading apparatus 100. When the connection between the downloading apparatus 100 and the server 300 is disconnected or prematurely disrupted due to power outage, for example, and the downloading apparatus 100 is reconnected to the server 300 and restarts downloading data, the data storing unit 130 may store new data in the predetermined folder in which the previously downloaded data is stored. When the new data downloaded from the server 300 is subsequent data to the previously downloaded data, the new data may be continuously stored in the predetermined folder in which the previously downloaded data is stored. The data storing unit 130 then transmits the downloaded data to the signal processing unit 140.

The download information storing unit 160 stores download information on data downloading. When the communication unit 120 is connected to the server 300 or a database and starts downloading data, the control unit 180 generates download information. Download information may include information on a state that the downloading apparatus 100 is currently downloading data, information identifying a server that is transmitting data to the downloading apparatus 100, and information identifying a predetermined location of the data storing unit 130 in which the downloaded data is being stored. The control unit 180 stores the generated download information in the download information storing unit 160. The download information storing unit 160 may preferably be a non-volatile memory that does not lose stored information even when the power is cut off. Examples of the non-volatile memory include a read only memory (ROM) or a flash memory. The download information storing unit 160 may also be a non-volatile random access memory (RAM) that does not lose information when power is cut off.

The control unit 180 controls the operations of the downloading apparatus 100 that executes a downloading process according to aspects of the present invention. The control unit 180 includes a register (not shown) to temporarily store an arithmetic logic unit (ALU) for calculation, data, and commands. When the recording medium 175 is loaded in the downloading apparatus 100 and a program that is required to reproduce data recorded in the recording medium 175 is available in the server 300, or when the user orders the control unit 180 to download predetermined data via the user interface 110, the control unit 180 connects the communication unit 120 to the server 300 to download the required program. The control unit 180 generates download information on data downloading when data downloading begins, and stores the generated download information in the download information storing unit 160.

When the user disconnects the downloading apparatus 100 from the server 300 even though data downloading is not completed or the connection between the server 300 and the downloading apparatus 100 is interrupted due to power outage or other problems, and the downloading apparatus 100 is ready to be connected to the server 300 again later, the control unit 180 identifies data that was being downloaded using the download information stored in the download information storing unit 160. When the download information is stored in the download information storing unit 160, the control unit 180 may identify data for which downloading was not completed in the data storage unit 130 or the recording medium 175. The control unit 180 controls an on screen display (OSD) processing unit (not shown) of the output unit 150 to generate and output OSD data so that the user can decide whether to download the data again.

If the user decides to continuously download the data that was being downloaded via the user interface 110, the control unit 180 identifies the server 300 using the download information, and allows the communication unit 120 to reconnect to the identified server 300 in order to resume data downloading. The control unit 180 identifies the location where the previously downloaded data is stored in the data storing unit 130 or the recording medium 175 using the download information, so that data is continuously downloaded and stored from the point where data downloading was stopped. The control unit 180 discards the download information when the data downloading is completed. If the user decides not to download the data, the download information may be deleted, or may be maintained if the user decides to download the data again later.

When the recording medium 175 in which data is recorded is loaded in the downloading apparatus 100 and the data is downloaded in the recording medium 175, if the user inputs a command to the user interface 110 to output the data recorded in the recording medium 175, the reading unit 170 reads the data from the recording medium 175 and transmits the read data to the signal processing unit 140. The signal processing unit 140 decodes the data of the recording medium 175 that is read by the reading unit 170 or the data stored in the data storing unit 130 and converts the data to a format that can be output by the output unit 150, and transmits the converted data to the output unit 150.

The output unit 150 outputs the overall status of the downloading apparatus 100 or information input by the user via the user interface 110 through a screen or a speaker. The output unit 150 may include a display unit (not shown) outputting a video signal or a speaker (not shown) outputting an audio signal. The output unit 150 outputs the information read from the recording medium 175 that is inserted into the downloading apparatus 100 or outputs the data downloaded from the server 300. The output unit 150 may include an OSD processing unit that generates a user control list and outputs the user control list. When the downloading apparatus 100 is disconnected from the server 300 although data downloading from the server 300 is not completed, the output unit 150 may generate a screen inquiring whether to reconnect to the server 300 and to continue data downloading, and outputs the screen to the user. When the user wants to reconnect to the server 300 and to continue data downloading, the downloading apparatus 100 starts data downloading, and the output unit 150 outputs information indicating that the data is being re-downloaded. When the user does not want to reconnect to the server 300 and download the data, the downloading apparatus 100 deletes the previously downloaded data, and the output unit 150 outputs a message informing the user that the previously downloaded and stored data was deleted.

Figure 2:
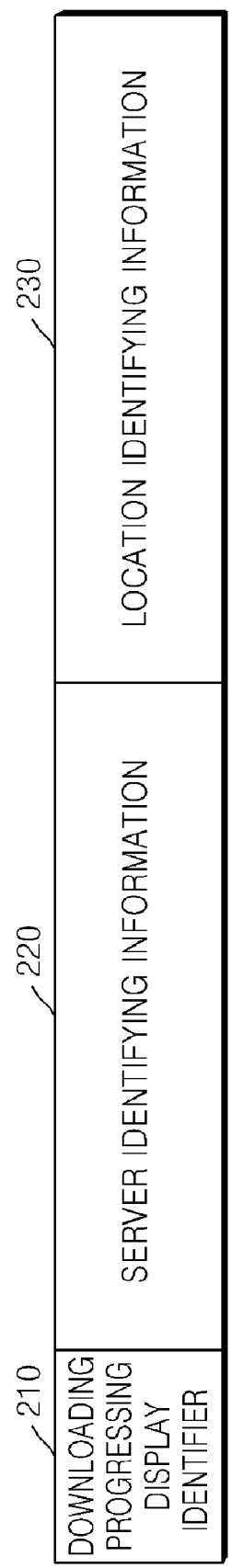
FIG. 2 illustrates download information according to an example embodiment of the present invention.

FIG. 2 shows download information according to an example embodiment of the present invention. The download information includes a downloading progressing display identifier 210, server identifying information 220, and location identifying information 230. The downloading progressing display identifier 210 indicates that the downloading apparatus 100 is downloading predetermined data. When the downloading apparatus 100 is ready to be connected to the server 300 again, after a disconnection between the downloading apparatus 100 and the server 300, the control unit 180 can determine that there is data that was being downloaded via the downloading progressing display identifier 210. As the downloading progressing display identifier 210 is information indicating that data being downloaded is present, the downloading progressing display identifier 210 can be expressed as 1 bit data.

The server identifying information 220 identifies the server 300 that transmits data. The downloading apparatus 100 may obtain required information from a number of servers that provide various services. Thus, when downloading data, the downloading apparatus 100 should know from which server the data is being downloaded, in order to reconnect to the server later. The server identifying information 220 may be a uniform resource locator (URL) of a server. A URL identifies locations of files in each of the servers providing services on the Web, and may include the type of a service, the location of a server (domain name), the location of a file, etc.

The location identifying information 230 identifies the location in the downloading apparatus 100 where the downloaded data is stored. When data downloading is discontinued and then data subsequent to the previously downloaded data begins to be downloaded, the location where the previously downloaded data is stored should be known in order to continuously store the new data being downloaded after the previously downloaded data. Data may be downloaded in the data storing unit 130, or in some cases, in the recording medium 175 inserted into the downloading apparatus 100. When data is stored in a predetermined folder in the data storing unit 130, the location identifying information 230 may be the name of the folder. When data is stored in a predetermined folder of the recording medium 175, the location identifying information 230 includes information to identify the recording medium 175, for example, the ID of the recording medium 175, and the name of the predetermined folder in which data is stored in the recording medium 175.

FIGS. 3A-3B shows an OSD screen that is output by the output unit 150, according to an example embodiment of the present invention. When the downloading apparatus 100 is ready to be reconnected to the server 300, after the connection between the downloading apparatus 100 and the server 300 is disconnected and data downloading is discontinued, the control unit 180 determines that data exists for which downloading is not completed based on the downloading progressing display identifier 210 that is stored in the download information storing unit 160. The control unit 180 then controls an OSD processing unit of the output unit 150 to generate an OSD screen 310 or 330 inquiring whether to perform data downloading again and to output the generated OSD screen 310 or 330. The user can identify data that was being downloaded through the OSD screen 310 or 330 that is output by the output unit 150. When the user does not want to download data, the OSD processing unit generates an OSD screen 320 informing the user that the previously downloaded data will be deleted, and outputs the OSD screen 320. When the user wants to continue to download data, the OSD processing unit generates an OSD screen 340 informing the user that data re-downloading has started and outputs the OSD screen 340.

Figure 4:
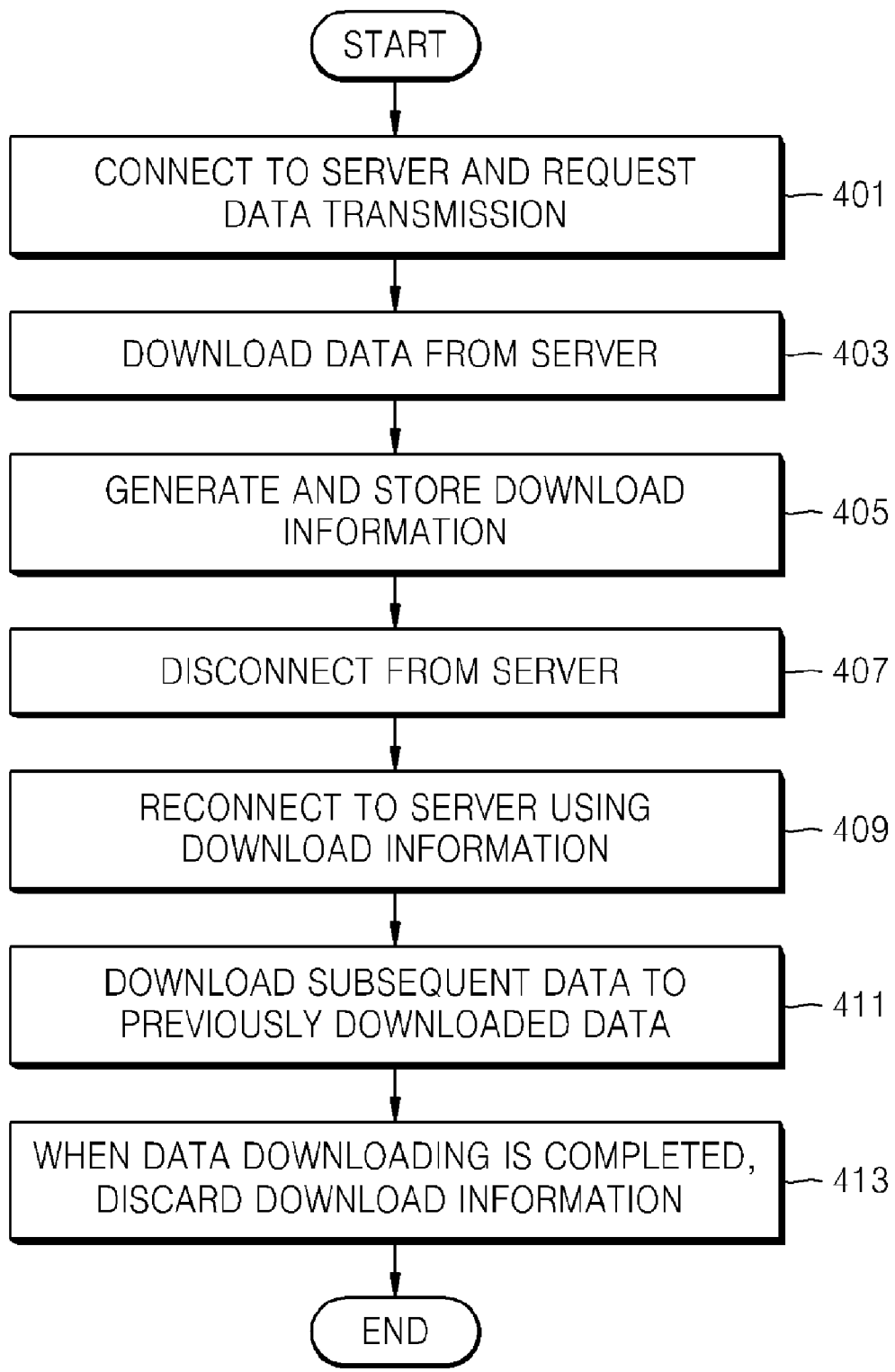
FIG. 4 is a flowchart of a process of downloading data according to an example embodiment of the present invention.

FIG. 4 is a flowchart of a process of downloading data according to an example embodiment of the present invention. According to a command of a user, the downloading apparatus 100 is connected to a predetermined server 300 via a communication network 200 and requests the server 300 to transmit data in operation 401. The downloading apparatus 100 receives the requested data from the server 300 in operation 403. The control unit 180 of the downloading apparatus 100 generates download information when data downloading begins, and stores the download information in the download information storing unit 160 in operation 405. When the downloading apparatus 100 is disconnected from the server 300 in operation 407, and the downloading apparatus 100 is ready to be reconnected to the server 300, the control unit 180 notices data that was being downloaded before the disconnection exists using the download information and that the connection to the server 300 was interrupted although the data downloading was not completed. When the user wants to download data that was not completely downloaded, the control unit 180 identifies the previously connected server 300 using the server identifying information 220 in the download information. The downloading apparatus 100 is reconnected to the server 300 in operation 409, and data subsequent to the previously downloaded data begins to be downloaded in operation 411. The control unit 180 discards the download information when data downloading is completed in operation 413.

Figure 5:
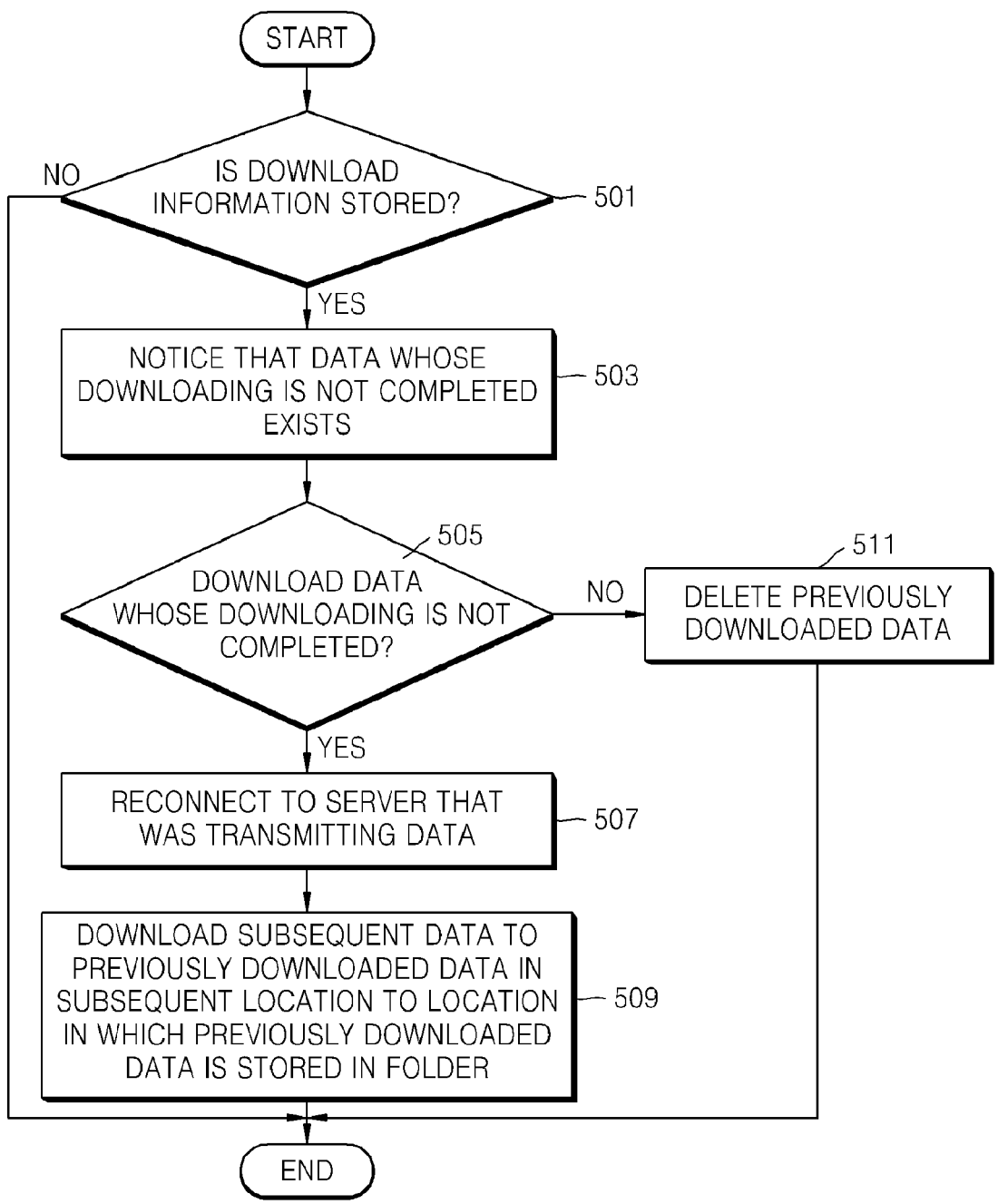
FIG. 5 is a flowchart of a process of downloading data according to another example embodiment of the present invention.

FIG. 5 is a flowchart of a process of downloading data according to another example embodiment of the present invention. When the downloading apparatus 100 is turned on, the control unit 180 determines whether download information is stored in the downloading apparatus 100 in operation 501. If download information is stored in the download information storing unit 160 or the download processing display identifier 210 is included in the downloaded information, the control unit 180 notices in operation 503 that data exists that was not completely downloaded before the downloading apparatus 100 was reconnected to the server 300. The downloading apparatus 100 generates an OSD screen so that a user can decide whether to download the data and outputs the OSD screen in operation 505. When the user wants to download data, the downloading apparatus 100 extracts the server identifying information 220 included in the download information and is reconnected to the previously connected server 300 in operation 507. The control unit 180 can determine the location of subsequent new data to be downloaded using the total capacity of data to be downloaded and the capacity of the previously downloaded data. The downloading apparatus 100 determines the location where previously downloaded data is stored using the location identifying information included in the download information, and downloads the subsequent data to the previously downloaded data in the subsequent location to the location in which the previously downloaded data is stored in the folder in operation 509. When the user does not want to download data again, the downloading apparatus 100 deletes the previously downloaded data in operation 511. By deleting the previously downloaded data, decrease of data storing and reproducing speeds due to fragmentation of previously downloaded data can be prevented.

According aspects of the present invention, when the downloading apparatus downloads data from a server via a communication network, download information on data downloading is generated and stored in a non-volatile memory of the downloading apparatus, and thus even when the connection between the downloading apparatus and the server is disconnected due to, for example, power outage, the downloading apparatus can be reconnected to the server using the previously stored download information and download data. According to additional aspects of the present invention, when the connection to a server is interrupted and thus data downloading is discontinued, subsequent data to the previously downloaded data can be downloaded when reconnecting to the server.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of downloading data using a downloading apparatus, the method comprising:
 connecting the downloading apparatus to a server, via a network, and downloading data from the server;
 generating, at the downloading apparatus, download information about the downloading;
 reconnecting the downloading apparatus to the same server using the download information when the connection to the server is interrupted and the downloading is discontinued; and
 downloading data from the reconnected server;

wherein the download information comprises server identifying information identifying the server transmitting the data, a downloading progressing display identifier indicating whether data is being downloaded, and location identifying information indicating a location in the downloading apparatus where the downloaded data is stored;

the reconnecting to the server using the download information comprises:
- determining that data for which downloading is not completed exists using the downloading progressing display identifier, and
- reconnecting to the server using the server identifying information; and the downloading of the data from the reconnected server comprises:
- identifying a location in which the previously downloaded data is stored in a local storage of the downloading apparatus using the location identifying information, and
- storing data downloaded from the reconnected server in the folder.

2. The method of claim 1, wherein the downloading of the data from the reconnected server comprises downloading data subsequent to the previously downloaded data.

3. The method of claim 2, further comprising discarding the download information when the data downloading is completed.

4. The method of claim 2, wherein:
- the interruption of the connection to the server occurs when the downloading apparatus is turned off; and
- the reconnecting to the server using the download information is performed when the downloading apparatus is turned on.

5. The method of claim 2, wherein the downloading of the subsequent data comprises determining the subsequent data based on the total capacity of data to be downloaded and the capacity of the previously downloaded data.

6. The method of claim 2, wherein the reconnecting to the server comprises:
- receiving a request from a user to retransmit data for which downloading has been discontinued; and
- reconnecting to the server in response to the request for retransmission.

7. The method of claim 2, further comprising storing the generated download information in a non-volatile memory in the downloading apparatus.

8. The method of claim 7, wherein the non-volatile memory comprises a read only memory (ROM), a random access memory (RAM), and a flash memory.

9. The method of claim 1, wherein the server identifying information is a uniform resource locator (URL) of the server.

10. The method of claim 9, wherein the downloading of the data comprises storing the data in a predetermined folder in a local storage included in the downloading apparatus, wherein the location identifying information is used to identify the folder.

11. The method of claim 9, wherein:
- the downloading of the data comprises storing the data in a predetermined folder in a disk that is inserted into the downloading apparatus;
- wherein the location identifying information is used to identify the disk and the folder in the disk.

12. A downloading apparatus comprising:
- a communication unit to connect to a server via a communication network and to download data from the server;
- a data storing unit to store the data downloaded from the server; and
- a control unit to generate download information on data downloading, to control the downloading apparatus to download the data from the server, and when the downloading apparatus is disconnected from the server and the data downloading is discontinued, to reconnect the downloading apparatus to the server based on the download information so that the downloading apparatus starts downloading data subsequent to the previously downloaded data from the reconnected server;
- wherein the downloaded information comprises server identifying information identifying the server transmitting the data a downloading progressing display identifier indicating whether data is being downloaded, and location identifying information identifying a location in the downloading apparatus where the downloaded data is stored, and
- the control unit determines that data exists that has not completed downloading, based on the downloading progressing display identifier, reconnects the downloading apparatus to the server using the server identifying information, identifies a location in which the previously downloaded data is stored in a local storage of the downloading apparatus using the location identifying information, and controls the downloading apparatus such that the data downloaded from the reconnected server is stored in the location.

13. The apparatus of claim 12, wherein the control unit discards the download information when the data transmission is completed.

14. The apparatus of claim 12, wherein the disconnection from the server occurs when the downloading apparatus is turned off, and the downloading apparatus is reconnected to the server when the downloading apparatus is turned on.

15. The apparatus of claim 12, wherein the control unit determines the subsequent data based on the total capacity of data to be downloaded and the capacity of the previously downloaded data such that the communication unit starts downloading the subsequent data.

16. The apparatus of claim 12, further comprising:
- a user interface;
- wherein, when the user instructs the control unit via the user interface to redownload the data for which downloading has been discontinued, the control unit reconnects the communication unit to the server.

17. The apparatus of claim 12, further comprising:
- a download information storing unit to store the generated downloaded information;
- wherein the download information storing unit is a non-volatile memory comprising at least one of a ROM, a RAM, and a flash memory.

18. The apparatus of claim 12, wherein the server identifying information is a uniform resource locator (URL) of the server.

19. The apparatus of claim 18, wherein the data storing unit is a local storage unit, and the data downloaded from the server is stored in a predetermined folder in the local storage unit.

* * * * *